(No Model.)
J. BUDD.
Composition for Producing Non Fading Signs.
No. 238,483. Patented March 8, 1881.
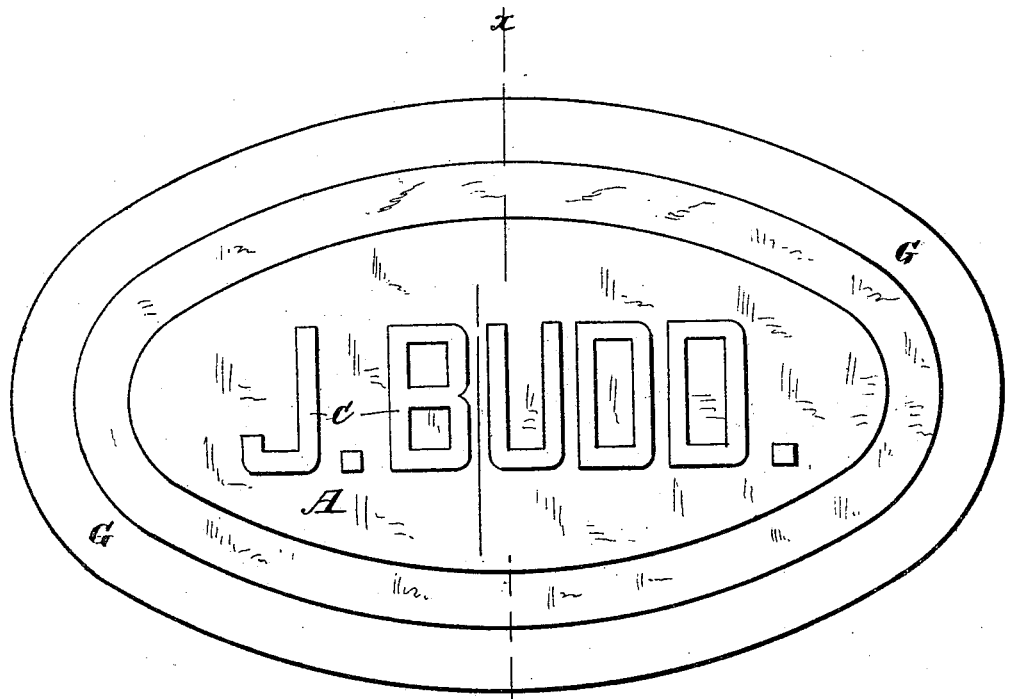
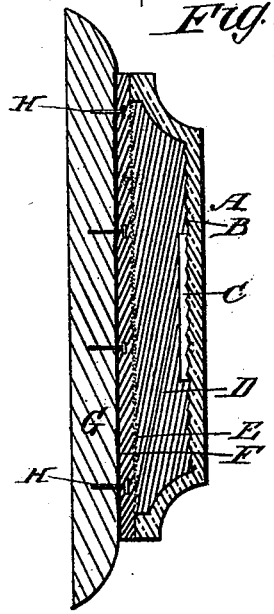
WITNESSES:
William H. Faber.
Alpha O. Smith.
INVENTOR:
James Budd,
BY Francis C. Bowen.
ATTORNEY.

UNITED STATES PATENT OFFICE.

JAMES BUDD, OF NEW YORK, N. Y.

COMPOSITION FOR PRODUCING NON-FADING SIGNS.

SPECIFICATION forming part of Letters Patent No. 238,483, dated March 8, 1881.

Application filed January 3, 1881. (No model.) Patented in England June 2, 1880.

*To all whom it may concern:*

Be it known that I, JAMES BUDD, of the city, county, and State of New York, have invented a certain new and useful Improved Composition of Materials for Producing Non-Fading Signs, Door-Plates, Devices, Addresses, and other similar purposes, (for which I have received Letters Patent in England, dated June 2, 1880;) and I do hereby declare that the following is a full, clear, and exact description of the invention, which will enable others skilled in the art to which it appertains to make and use the same.

My invention relates to an improved combination of materials for producing non-fading signs, door-plates, devices, addresses, or advertisements, or other similar purposes.

In carrying it into effect, I first manufacture or produce a kind of shell or dish, of glass, which glass is scored during the molding process. The glass shell or dish may be oval, round, rectangular, or any suitable shape. I then transfer, preferably in gold-leaf, the letters, designs, devices, or whatever else it is desired to exhibit, onto skin or thin paper. It is then cut with steel dies on a *lignum-vitæ* wood block, and the letters, designs, or devices are then placed upon the inner surface of the glass shell or dish, which is tempered or slightly heated to prevent the hot wax or pitch from breaking it. Heated engraver's wax or pitch hardened with spirits of wine is next poured on the skin or thin paper, and causes it to shrink up or be eaten up by the wax, at the same time leaving the gold letters, numbers, devices, or designs intact. Fine-powdered flint or rough sand is then put on the wax at a red heat, and forms a rough surface to receive a layer of plaster-of-paris mixed with glue, or Portland cement and glue, which is spread over the surface of the flint or sand and adheres thereto. The plaster-of-paris has a cooling property, and not only prevents the wax or pitch melting under increase of temperature, but greatly adds to the general strength of the combination. The whole is then placed, by preference, on a wooden backing, which is covered on its surface with pins, tacks, or other projections, to take into the plaster-of-paris mixed with glue or Portland cement.

Some of the advantages of the invention are that the letters, numbers, devices, designs, or whatever else it is desired to exhibit are free from the influence of the atmosphere, and will consequently last in their original brightness for an indefinite period, while the glass being scored, and the combination of materials making the whole a solid mass, render it so strong as to be practically free from accidental breakage, as it is stronger than plate-glass.

In the accompanying drawings, Figure 1 represents a face view of a door-plate ready for use, and Fig. 2 a vertical section of Fig. 1 through line $x\,x$.

A represents a glass shell or dish having its inside surface, B, scored. C represents letters, and D pitch or engraver's wax to hold them in position. E represents rough sand or ground flint, and F plaster-of-paris or cement. G is a wooden block or back having tacks or pins H slightly raised on its inside surface to take into the plaster-of-paris or cement, so as to hold the block or back in position, all being used as above described.

What I claim, and desire to secure by Letters Patent, is—

The process of producing non-fading designs or devices by transferring the designs or devices, cut with dies, on the inner surface of a glass shell or dish, then placing on the designs or devices a coating of engraver's wax or pitch to hold the designs or devices in position, next by adding to the wax or pitch a layer of rough sand or ground flint for the purpose of making plaster-of-paris or cement adhere to the same, and then securing the whole to a wooden back provided with tacks or pins on its inner surface, by uniting the said back to the plaster-of-paris before it sets or hardens, all substantially as described.

In testimony that I claim the foregoing I have hereunto set my hand this 22d day of December, 1880.

JAMES BUDD.

Witnesses:
R. C. RALSTON,
JOHN W. MINTON.